US012007725B2

(12) United States Patent
Rogers et al.

(10) Patent No.: US 12,007,725 B2
(45) Date of Patent: *Jun. 11, 2024

(54) HAND WASHING TIMER

(71) Applicant: Time Timer, LLC, Cincinnati, OH (US)

(72) Inventors: David M. Rogers, Cincinnati, OH (US); Heather Rogers, Cincinnati, OH (US); Tricia L. Wright, San Francisco, CA (US)

(73) Assignee: Time Timer LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,770

(22) Filed: Aug. 15, 2023

(65) Prior Publication Data
US 2023/0400815 A1  Dec. 14, 2023

Related U.S. Application Data

(63) Continuation of application No. 16/942,311, filed on Jul. 29, 2020, now Pat. No. 11,762,339, which is a continuation-in-part of application No. 29/743,535, filed on Jul. 22, 2020, now Pat. No. Des. 938,834.

(60) Provisional application No. 62/991,802, filed on Mar. 19, 2020.

(51) Int. Cl.
G04F 1/00 (2006.01)
A61H 33/00 (2006.01)
G02F 1/13357 (2006.01)

(52) U.S. Cl.
CPC ........ G04F 1/005 (2013.01); G02F 1/133603 (2013.01); A61H 33/005 (2013.01)

(58) Field of Classification Search
CPC .................................. G04F 1/00; G04F 1/005
See application file for complete search history.

(56) References Cited

U.S. PATENT DOCUMENTS

| 3,357,703 | A | 12/1967 | Hurley |
| D249,025 | S | 8/1978 | Nakamura |
| D298,414 | S | 11/1988 | Dawson, Jr. |
| D299,011 | S | 12/1988 | Brüssing |
| D299,316 | S | 1/1989 | Vickery |
| D386,690 | S | 11/1997 | Lewis |
| D414,428 | S | 9/1999 | Frantz |
| 6,388,952 | B2 | 5/2002 | Kim |
| 6,636,458 | B1 * | 10/2003 | Uptegraph ............. G04C 10/00 368/291 |
| D500,453 | S | 1/2005 | Cullen et al. |
| D515,440 | S | 2/2006 | Maddocks, III |
| 7,505,374 | B2 | 3/2009 | Booty, Jr. et al. |

(Continued)

Primary Examiner — Edwin A. Leon
Assistant Examiner — Jason M Collins
(74) Attorney, Agent, or Firm — Wood Herron & Evans LLP

(57) ABSTRACT

A hands-free visual timer enables a person to wash his or hands for the duration of time recommended by the Center for Disease Control. Upon activation, the timer displays an annular ring of thirty triangles and a first icon. After five seconds have passed, a second icon is displayed indicating the user should apply soap. After twenty-five seconds, a third icon is displayed indicating the user should rinse. After thirty seconds, the screen goes blank and all the triangles have disappeared. The central display of triangles is illuminated by a liquid crystal display. The icons are illuminated by light emitting diodes.

19 Claims, 12 Drawing Sheets

(56) References Cited

U.S. PATENT DOCUMENTS

| | | |
|---|---|---|
| D599,222 S | 9/2009 | Bialek-Wester |
| 7,773,464 B2 | 8/2010 | Rogers |
| D625,205 S | 10/2010 | Schermuly |
| D686,093 S | 7/2013 | Wright et al. |
| D720,638 S | 1/2015 | Rogers |
| D744,365 S | 12/2015 | Rogers |
| D760,221 S | 6/2016 | Maruyama et al. |
| D764,953 S | 8/2016 | Virhia et al. |
| D766,844 S | 9/2016 | Turksu et al. |
| D820,238 S | 6/2018 | Boshernitzan et al. |
| D830,412 S | 10/2018 | Linzie et al. |
| D830,858 S | 10/2018 | Rogers et al. |
| D839,755 S | 2/2019 | Du |
| 10,303,123 B1 | 5/2019 | Rogers et al. |
| 2004/0184357 A1 | 9/2004 | Shen |
| 2008/0253234 A1 | 10/2008 | Rogers |
| 2016/0086577 A1 | 3/2016 | Broadbent et al. |
| 2019/0072910 A1 | 3/2019 | Ghassabian |
| 2020/0019126 A1 | 1/2020 | Scorgie et al. |
| 2021/0294273 A1 | 9/2021 | Rogers et al. |

\* cited by examiner

HAND WASHING TIMER

CROSS REFERENCE TO RELATED APPLICATIONS

This application is a Continuation of U.S. patent application Ser. No. 16/942,311 filed Jul. 29, 2020 (pending), which claims the benefit of priority to U.S. Provisional Patent Application Ser. No. 62/991,802 filed Mar. 19, 2020 and is a Continuation-In-Part of U.S. Design patent application Ser. No. 29/743,535 filed Jul. 22, 2020 (now U.S. Design Pat. No. D938,834). Each of these applications is fully incorporated by reference herein.

FIELD OF THE INVENTION

This invention relates generally to an apparatus and method for assisting a person perform an activity including but limited to washing his or her hands for a predetermined time period.

BACKGROUND OF THE INVENTION

With the spread of infectious disease, the Center for Disease Control has recommended people wash their hands for a minimum of 20 seconds. In order to accurately count the 20 second time period it has been suggested to sing certain songs or count out loud. One difficulty with such suggestions is that people count at different rates, get interrupted or don't want to sing. One solution to accurately count a specific time period would be to provide a visual timer which indicates an appropriate hand washing time period.

Applicant has timers which show time in a visual form. However, they require a user touch a portion of the timer to initially set the timer. Such touching is not recommended with a timer used by multiple people, especially in a place such as a restroom. One difficulty is placing a timer in a restroom is that such an environment is wet and may damage the timer. It may be difficult to secure a timer is a location which is visible to a person washing his or her hands.

Therefore, it would be desirable for a visual timer to be hands-free and started without touching the timer.

There is further a need for a visual hands-free timer which may display a predetermined time along with an image of an activity.

There is further a need for a visual hands-free timer which may incorporate sound into the timer including music.

SUMMARY OF THE INVENTION

According to one aspect of the invention, a hands-free visual timer for counting thirty seconds comprises a cup-shaped housing having an interior and a battery compartment for storing at least one battery. The battery compartment is covered with a removable door. The battery or batteries powers a circuit board located in the interior of the cup-shaped housing. The circuit board activates a liquid crystal display ("LCD") also located in the interior of the cup-shaped housing along with three light emitting diodes ("LEDs").

The hands-free visual timer further comprises a rear cover adapted to be secured to the cup-shaped housing. The rear cover covers the battery compartment and batteries such that water or liquid does not enter the battery compartment and harm the batteries or any other part of the timer. The rear cover may be adapted to rotate relative to the cup-shaped housing to secure the rear cover to the cup-shaped housing. The rear cover has a keyhole adapted to receive a suction cup to mount the timer on a vertically oriented surface. The rear cover and cup-shaped housing each have cutouts which cooperate to trap a protrusion of a suction cup used to secure the timer on a horizontally oriented surface such as a countertop next to a sink.

A speaker is located inside a recess in the interior of the cup-shaped housing. The speaker is powered by the batteries. The speaker is activated by a toggle switch located at the top of the timer. However, the toggle switch may be in any other desired position. The toggle switch changes the timer between three sound modes: 1) a "silent" sound mode in which the speaker is silent; 2) a "beep" sound mode in which the speaker makes a first "beep" upon being activated by a light sensor, a second "beep" sound after five seconds have elapsed from the start of the timer, a third "beep" sound after twenty-five seconds have elapsed from the start of the timer and a fourth "beep" sound after thirty seconds have elapsed from the start of the timer; and 3) a "full" sound mode in which the speaker makes the four "beep" sounds at the times described above and plays a song during the entire thirty second period.

The hands-free visual timer further comprises a liquid crystal display ("LCD") capable of showing an annular ring of triangles which disappear as time elapses. Each second of the thirty second time period which elapses, one of the triangles disappears and becomes invisible to the user. In the preferred embodiment, the triangles disappear in a clockwise direction as time elapses. However, the triangles may disappear in the counterclockwise direction as time passes. Although the LCD displays thirty triangles, the present invention may use any number of triangles including twenty triangles, one for each second of hand washing.

The hands-free visual timer further comprises a front bezel having a circular central opening which allows the LCD displaying the annular ring of triangles to shine through the front bezel. The front bezel further comprises three peripheral openings evenly spaced about the circular central opening. Each of the peripheral openings allows light from one of the three LEDs to illuminate an icon secured to a plastic front lens. The plastic front lens is secured to the front bezel. At least one light sensor powered by the circuit board enables a person to activate or start the timer by passing his or her hand over at least one of the light sensors. A person may stop the timer by holding his or her hand over at least one of the light sensors for several seconds.

The timer is adapted to receive and retain a suction cup either behind or below the timer. The suction cup may secure the timer in a desired location such as on a mirror in a bathroom above a sink used for washing hands. The timer has a flat surface on the bottom thereof such that the timer may rest on a horizontal surface without falling over and without the use of any suction cup.

The plastic front lens has multiple icons or symbols silkscreened on a back surface of the plastic front lens. At approximately the one o'clock position a first icon comprising a hand and a bottle is silkscreened on a back surface of the plastic front lens. At approximately the five o'clock position a second icon comprising two hands and soap suds is silkscreened on a back surface of the plastic front lens. At approximately the ten o'clock position a third icon comprising a hand and a faucet is silkscreened on a back surface of the plastic front lens.

In a second aspect, a hands-free visual timer for displaying a thirty second time period comprises a housing having a battery compartment for storing at least one battery. The battery compartment is covered with a removable door. The at least one battery powers a circuit board located in an interior of the housing. The circuit board contains multiple light emitting diodes.

The hands-free visual timer further comprises a waterproof rear cover for covering the battery compartment. The waterproof rear cover is adapted to be secured to the housing by rotating the waterproof rear cover relative to the housing. The waterproof rear cover has a keyhole adapted to receive a suction cup to mount the timer on a vertically oriented surface or hang the timer from a protrusion such as a nail. The rear cover and cup-shaped housing each have cutouts which cooperate to trap a protrusion of a suction cup used to secure the timer on a horizontally oriented surface such as a countertop next to a sink.

The hands-free visual timer further comprises a liquid crystal display capable of showing an annular ring of triangles which disappear as the thirty seconds elapses. The liquid crystal display is powered by the circuit board which is powered by the at least one battery. In one preferred embodiment, the annular ring of triangles comprises thirty triangles, one per second. In one preferred embodiment, the triangles disappear from view as time elapses in a clockwise direction.

The hands-free visual timer further comprises a front bezel secured to the housing. The front bezel has openings allowing light to pass through the openings. At least one light sensor is secured to the front bezel. The at least one light sensor activates the timer. A plastic front lens is secured to the front bezel in front thereof. Multiple icons are silkscreened on a back surface of the plastic front lens.

In a third aspect, a method of using a hands-free visual timer for assistance washing hands for a predetermined time period comprises the following steps. Activating a light sensor secured to a front bezel of the timer by waving a hand in front of the timer, the front bezel of the timer being secured to a housing. The housing has a battery compartment for storing at least one battery to power the timer. Upon activation, a single-color liquid crystal display shows an annular ring of triangles and a light emitting diode displays a first iconic image outside the annular ring of triangles on the outer surface of a plastic front lens. Upon seeing the display of annular ring of triangles when the sound mode is silent or hearing the initial beep when the sound mode is in its "full" or "beep" mode, a user turns on a faucet to begin the process of washing his or her hands.

The second step comprises waiting five seconds until five of the thirty triangles of the ring disappear. At this point, a speaker inside the housing makes a "beep" sound and a second iconic image appears on the outer face of the timer outside the remaining triangles of the display. This second iconic image and/or "beep" sound indicates to a user to apply soap to his or her hands.

The third step comprises waiting an additional twenty seconds until twenty-five (twenty more) of the thirty triangles of the ring disappear from the display. At this point, a speaker inside the housing makes another "beep" sound and a third iconic image appears on the outer face of the timer outside the five remaining triangles of the display. This third iconic image and/or "beep" sound indicates to a user to wash the soap off his or her hands.

The last step comprises waiting an additional five seconds until all thirty triangles of the ring have disappeared from the display. At this point, a speaker inside the housing makes another "beep" sound and the display is blank. The timer then enters a sleep mode.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
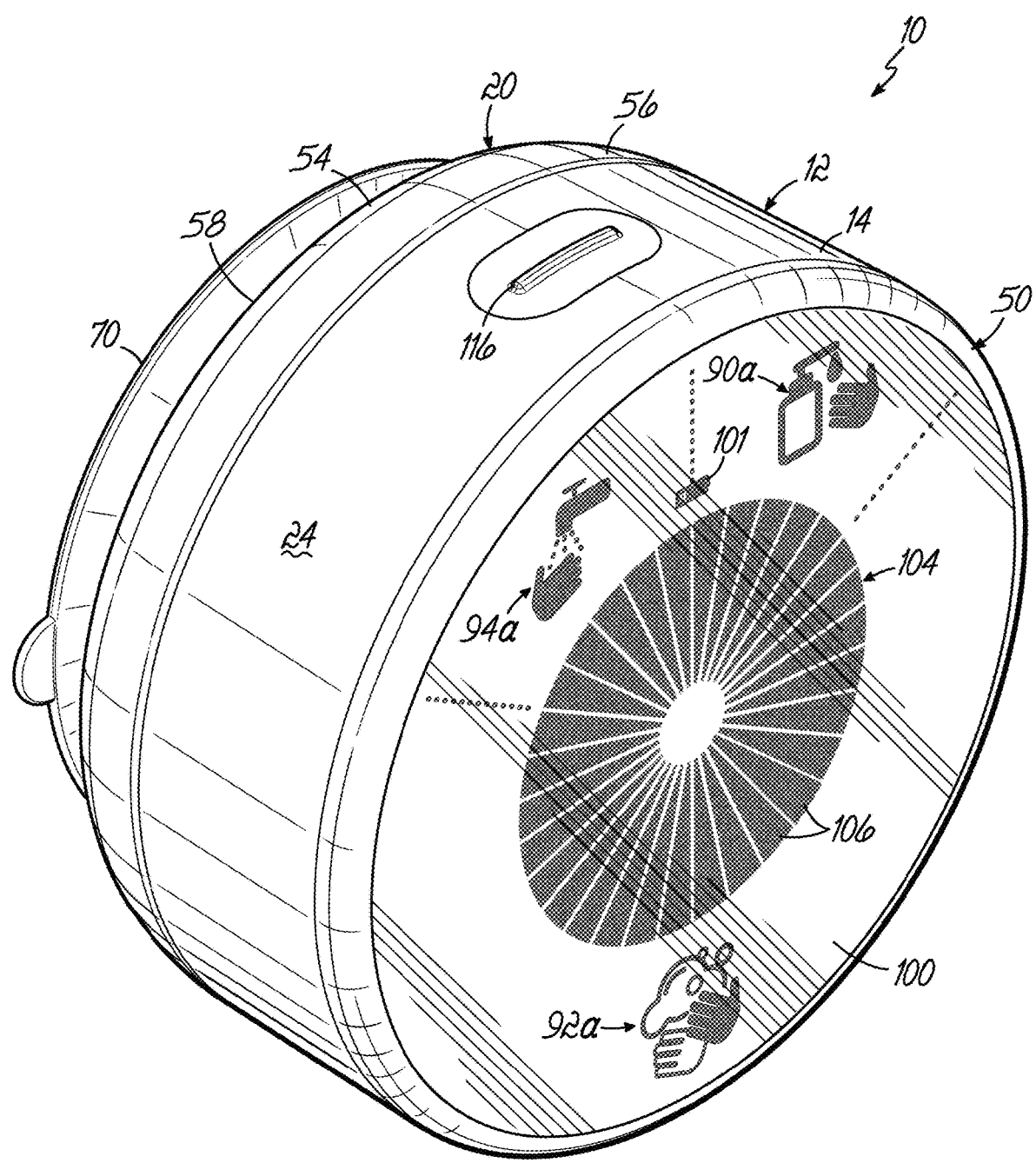
FIG. 1 is a front perspective view of one embodiment of hands-free visual timer having a rear suction cup in accordance with the present invention.
Figure 2:
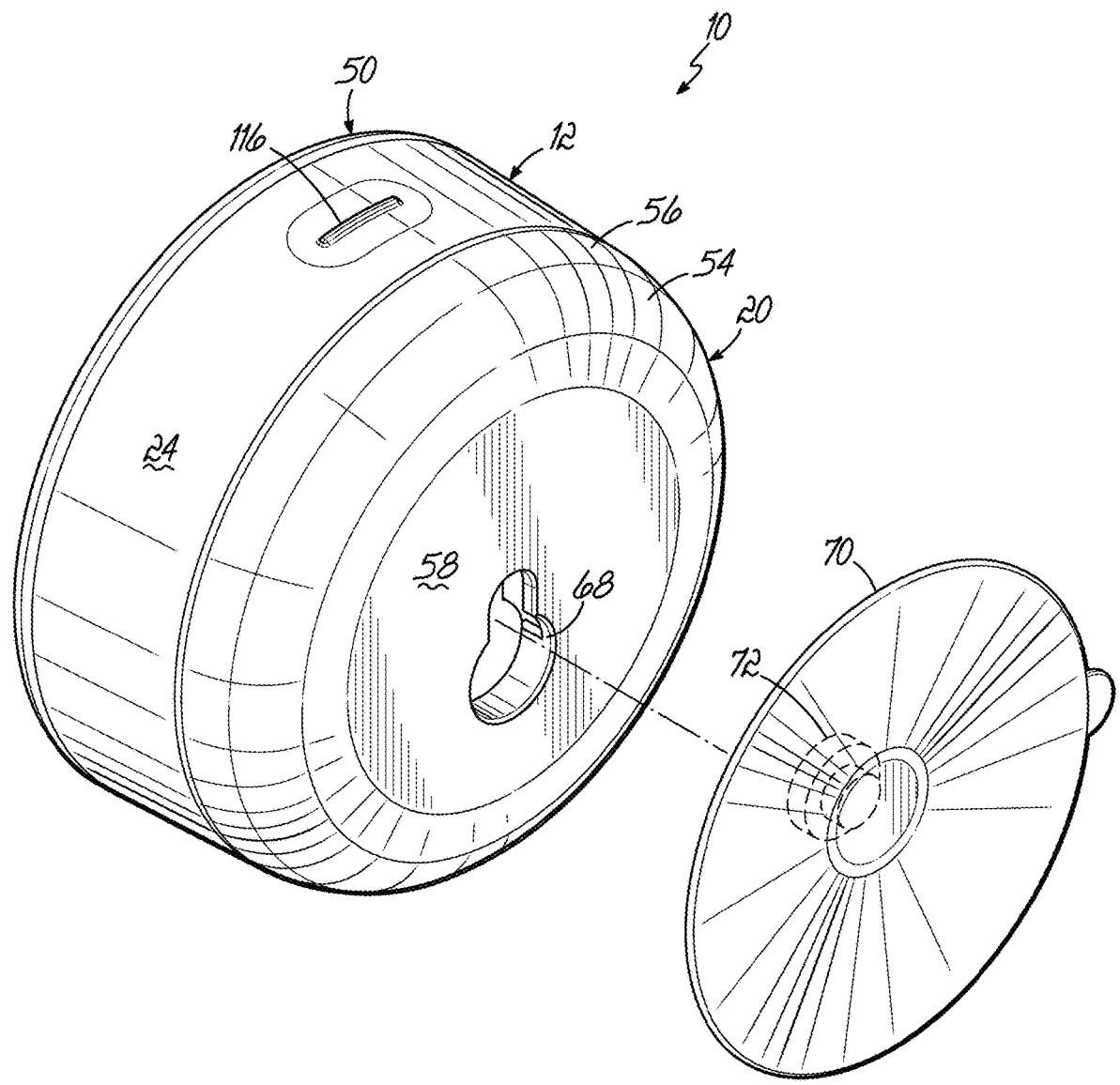
FIG. 2 is a rear perspective view of the timer of FIG. 1 showing the rear suction cup being removably secured to the timer.
Figure 3:
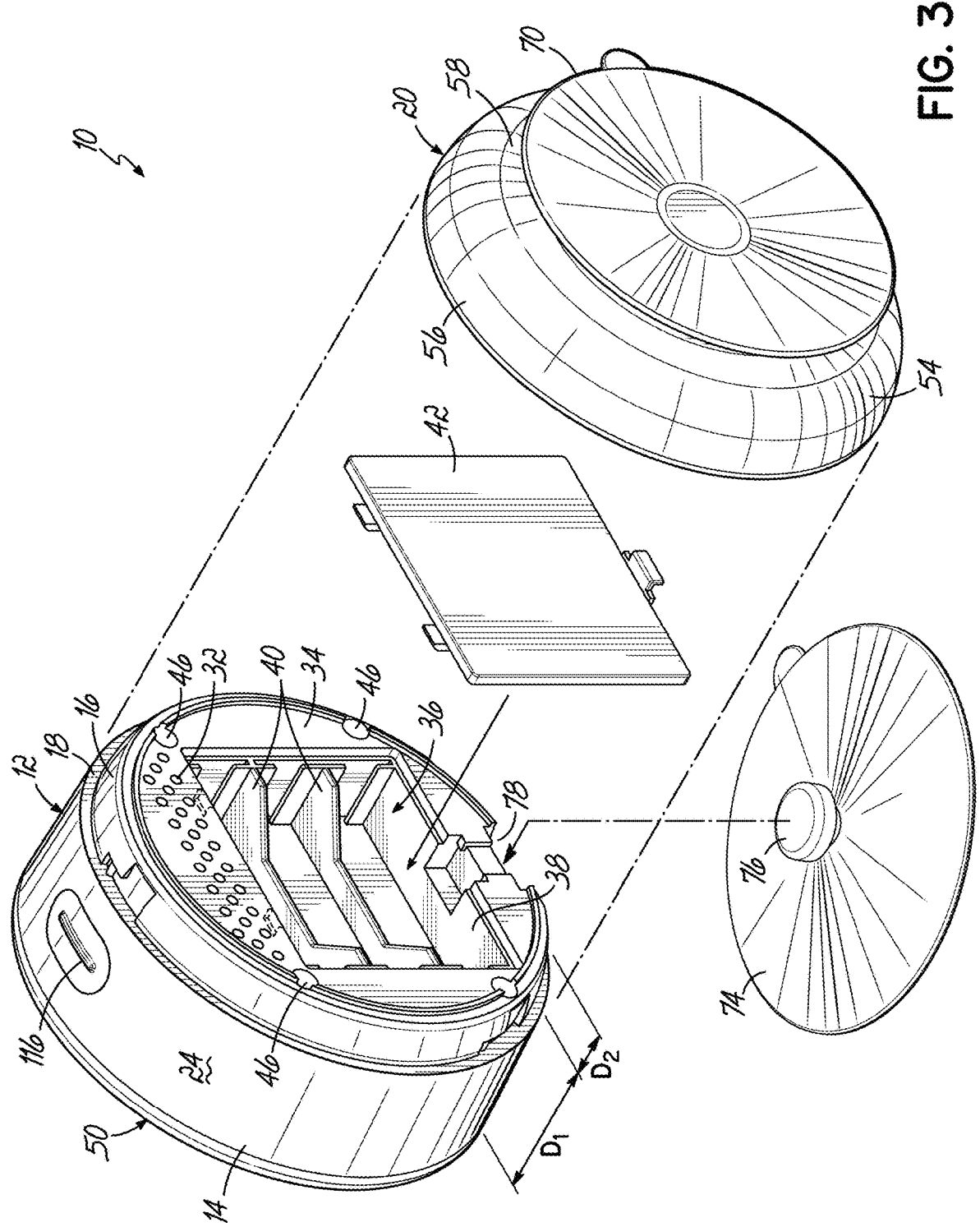
FIG. 3 is a partially disassembled rear perspective view of the timer of FIG. 1 showing a second bottom suction cup being removably secured thereto.
Figure 4:
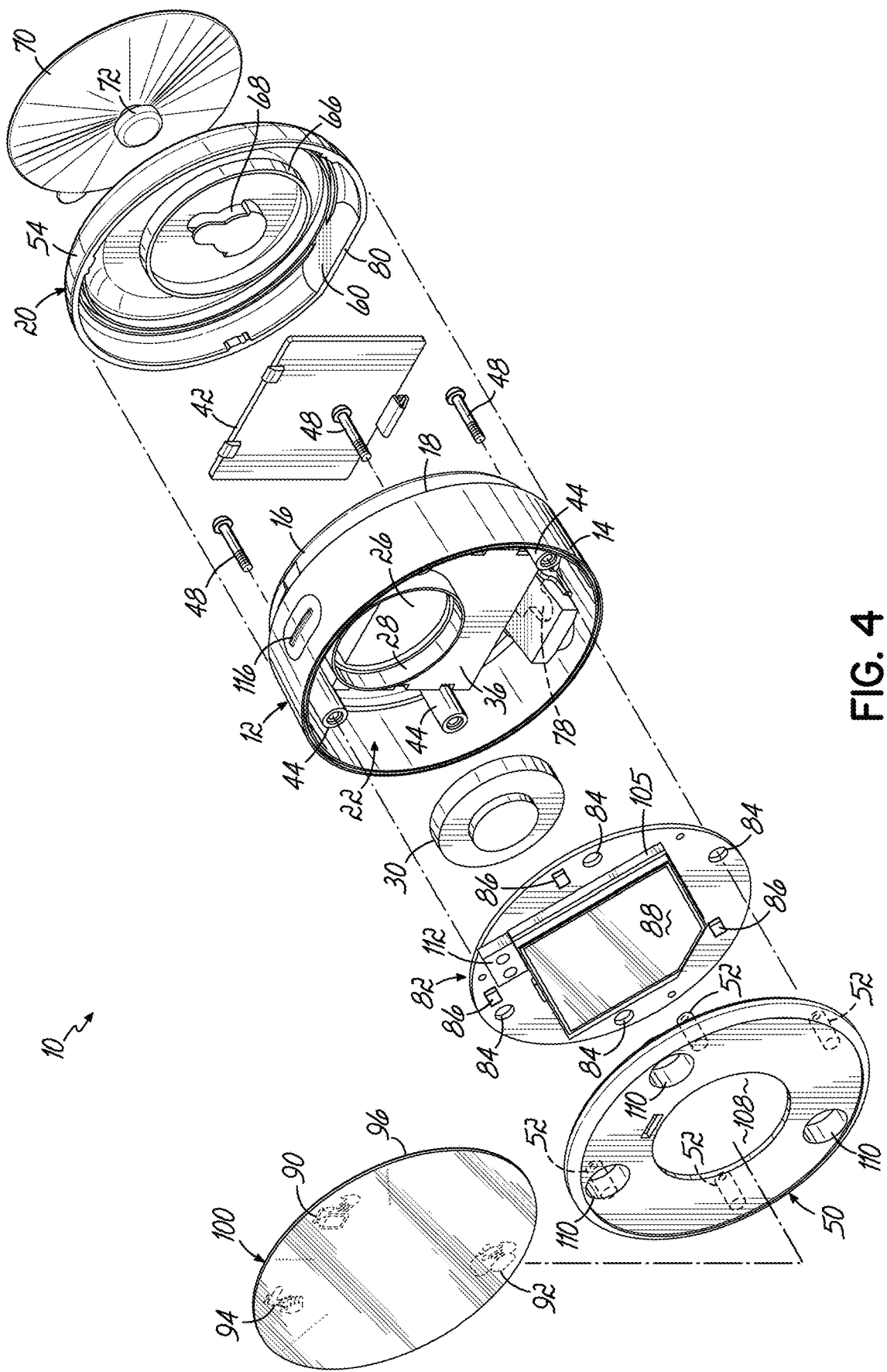
FIG. 4 is a partially disassembled front perspective view of the timer of FIG. 1.

Referring first to FIG. 1, there is illustrated a hands-free visual timer 10 incorporating the principles of the present invention. As best shown in FIG. 4, the hands-free visual timer 10 comprises a generally cylindrical housing 12. As best shown in FIG. 3, the housing 12 has a front portion 14 having a depth $D_1$ and a rear portion 16 having a depth $D_2$ less than $D_1$. The rear portion 16 has a smaller diameter than the front portion 14 and is separated therefrom by a ledge 18 used in connection with securing a rear cover 20 to the housing 12 in a manner described below.

As best shown in FIG. 4, the front portion 14 of the generally cylindrical housing 12 has an interior 22 defined by a front outer wall 24. As shown in FIG. 4, inside the interior 22 of the housing 12 is a cavity 26 defined by a circular cavity wall 28 adapted to hold a speaker 30. As best shown in FIG. 3, sound is emitted from the speaker 30 through holes 32 in a rear wall 34 of the housing 12.

As best shown in FIG. 3, the housing 12 has a battery compartment 36 extending inwardly from a rear wall 34 of the housing 12. The battery compartment 36 has a floor 38 and two ledges 40 so it may hold three batteries 41. See FIG. 5. However, the battery compartment is not intended to be limited by the drawings. The battery compartment may be constructed to hold any number of batteries including a single battery.

As best shown in FIG. 4, the battery compartment 36 has a door 42 which may be removed to change a battery or batteries. As best shown in FIG. 4, the housing 12 also has four bosses 44 which extend through the housing 12. Each of the bosses 44 has a rear opening 46 as shown in FIG. 3 and is adapted to receive a fastener 48 used to secure the housing 12 to a front bezel 50. As best seen in FIG. 4, the front bezel 50 is generally round and has four receptacles 52, each receptacle 52 being adapted to receive a fastener 48.

Figure 5:
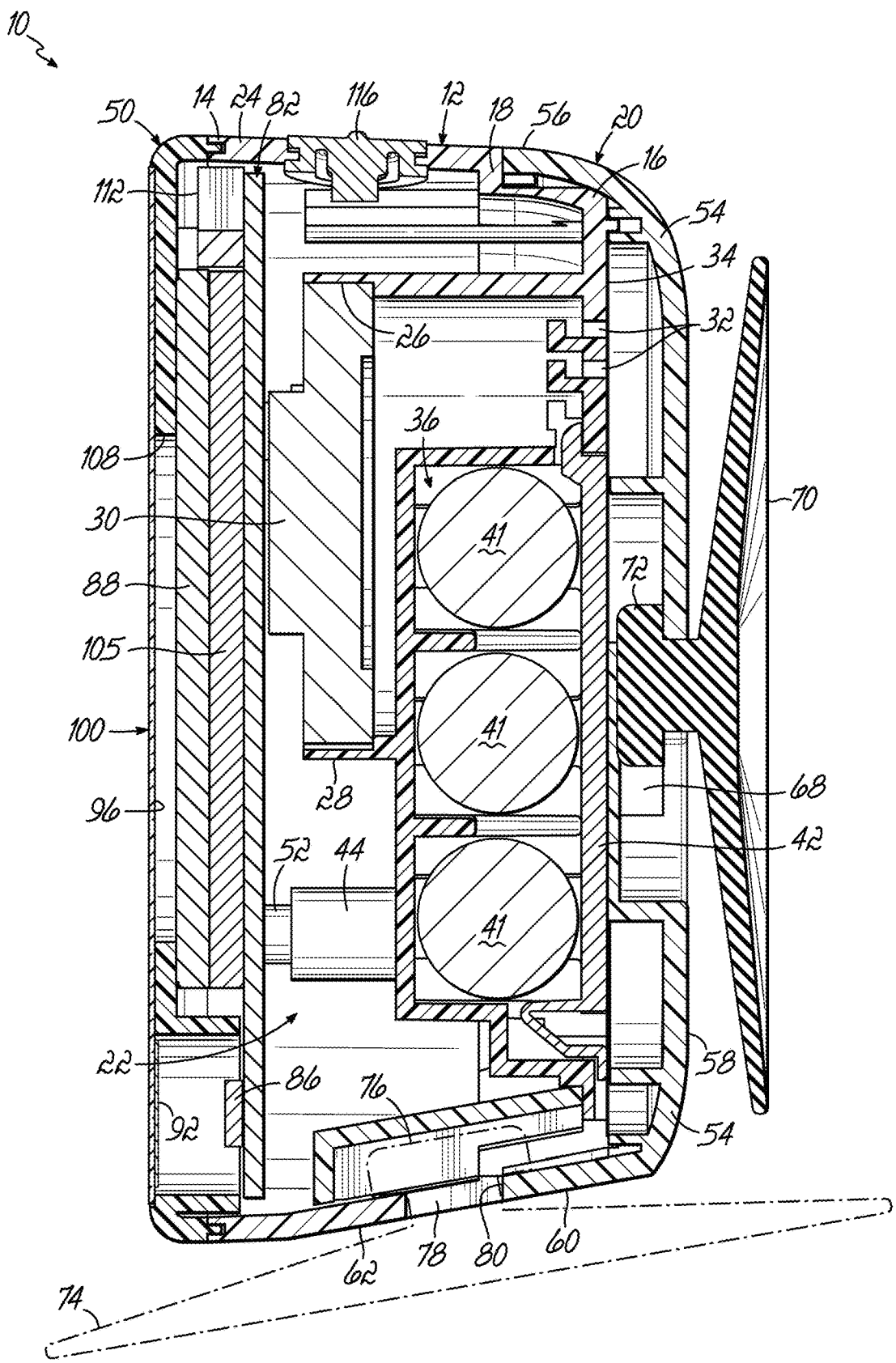
FIG. 5 is a cross-sectional view of the timer of FIG. 1 showing a rear suction cup in cross section and a bottom suction cup in dashed lines.
Figure 7:
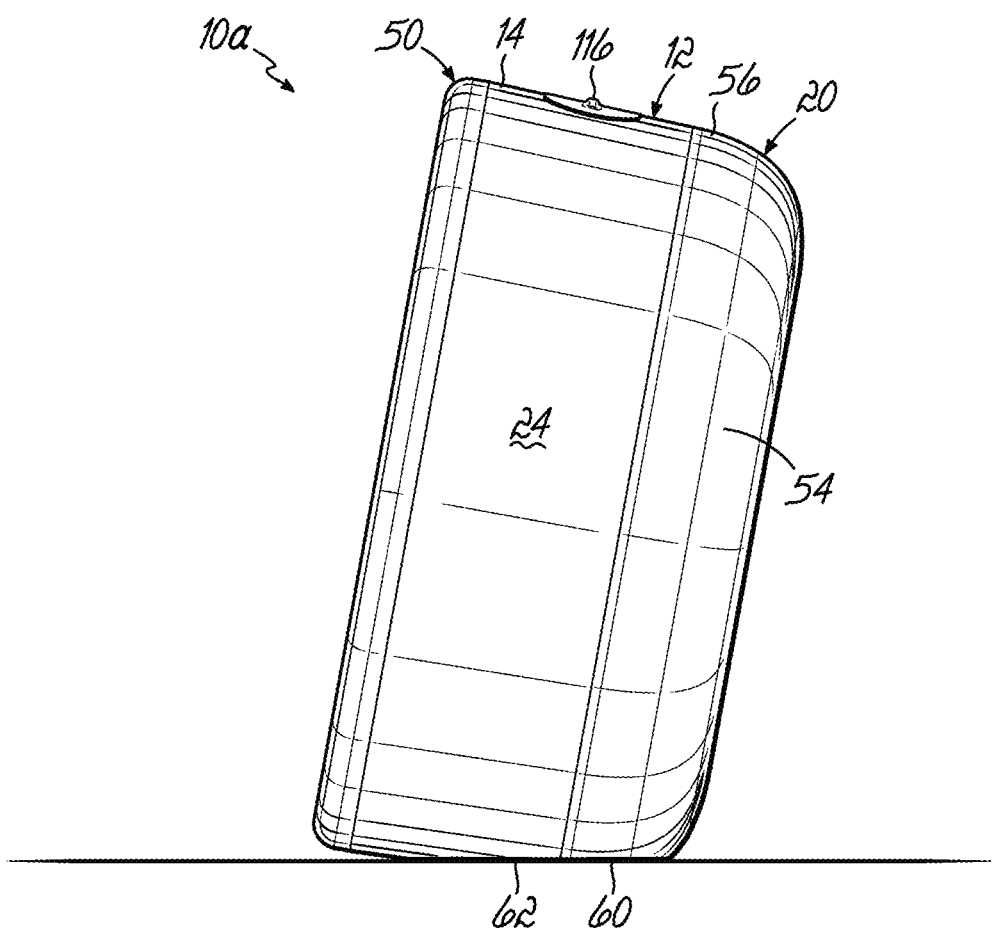
FIG. 7 is a side view of another embodiment of timer without any suction cups resting on a horizontal surface.

Another component of the hands-free visual timer 10 is the rear cover 20 for covering the battery compartment 36 and preventing liquid inside the battery compartment 36 where it could damage the battery or batteries. The rear cover 20 is removably secured to the housing 12 by rotating the rear cover 20 relative to the housing 12. As best shown in FIGS. 4 and 5, the rear cover 20 has an outer shell 54 including a side portion 56 and a rear portion 58. As shown in FIG. 7, the rear cover 20 has a flattened bottom portion 60 which cooperates with a flattened portion 62 of the housing 12 to enable a timer 10a lacking any suction cups to sit on a horizontal surface 64 without falling over. As best illustrated in FIG. 4, the rear cover 20 also has an inner lip 66 which abuts the door 42 of the battery compartment 36, as shown in FIGS. 4 and 5. The inner lip 66 is circular, as shown in FIG. 4. Inside the inner lip 66 is a keyhole 68 used to secure a rear suction cup 70 to the rear cover 20. As best shown in FIGS. 4 and 5, the rear suction cup 70 has a protrusion 72 which fits inside the keyhole 68. Although the keyhole 68 is illustrated as being a certain size and shape, it may assume other sizes, shapes or configurations.

FIG. 5 illustrates in dashed lines a bottom suction cup 74 having a protrusion 76 which is held in place between a cutout 78 in the rear portion 16 of the housing 12 and a cutout 80 in the side portion 56 of the outer shell 54 of the rear cover 20. See FIGS. 3 and 4.

FIG. 4 best illustrates another component of the hands-free visual timer 10, a circuit board 82 having four holes 84 through which the fasteners 48 pass. Three light emitting diodes 86 are secured to the circuit board 82 and used to light up the first, second and third icons 90, 92, 94 silkscreened on a rear surface 96 of the circular, solid plastic front lens 100. See FIG. 4. A liquid crystal display 88 is further attached to the circuit board 82 and used to illuminate a central display 104 comprising an annular ring of triangles 106. See FIG. 1. As shown in FIG. 5, the central display 104 of the liquid crystal display 88 is illuminated by a back light 105. Two light sensors 112 are incorporated into a chip which is attached to the circuit board 82 as shown in FIG. 4.

As shown in FIG. 4, in front of the circuit board 82, the front bezel 50 has a central opening 108 through which the central display 104 of triangles 106 is visible to a user in front of the timer. The front bezel 50 also has three spaced openings 110 outside the central opening 108 through which light from the light emitting diodes 86 passes to illuminate the icons 90, 92, 94 to create iconic images 90a, 92a, 94a on the front of the circular plastic front lens. Although the icons 90, 92, 94 are illustrated to be specific images, the present invention is not intended to limit the icons to the images shown. Any other icons may be used without departing from the spirit of the present invention. For example, any one of the icons may be a single hand, a pair of hands or soap suds.

Figure 6A:
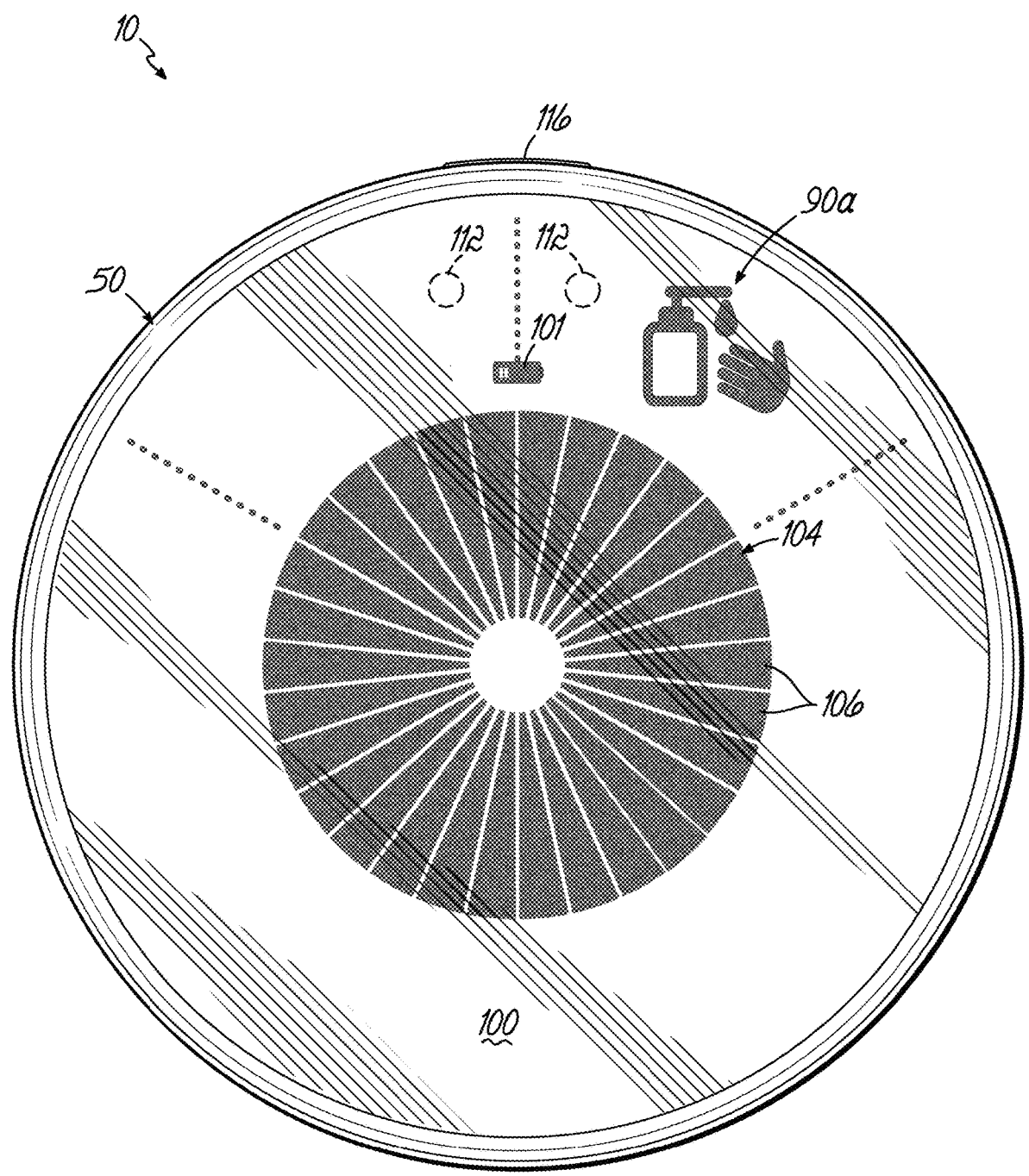
FIG. 6A is a front view of the timer of FIG. 1 upon activation.
Figure 6B:
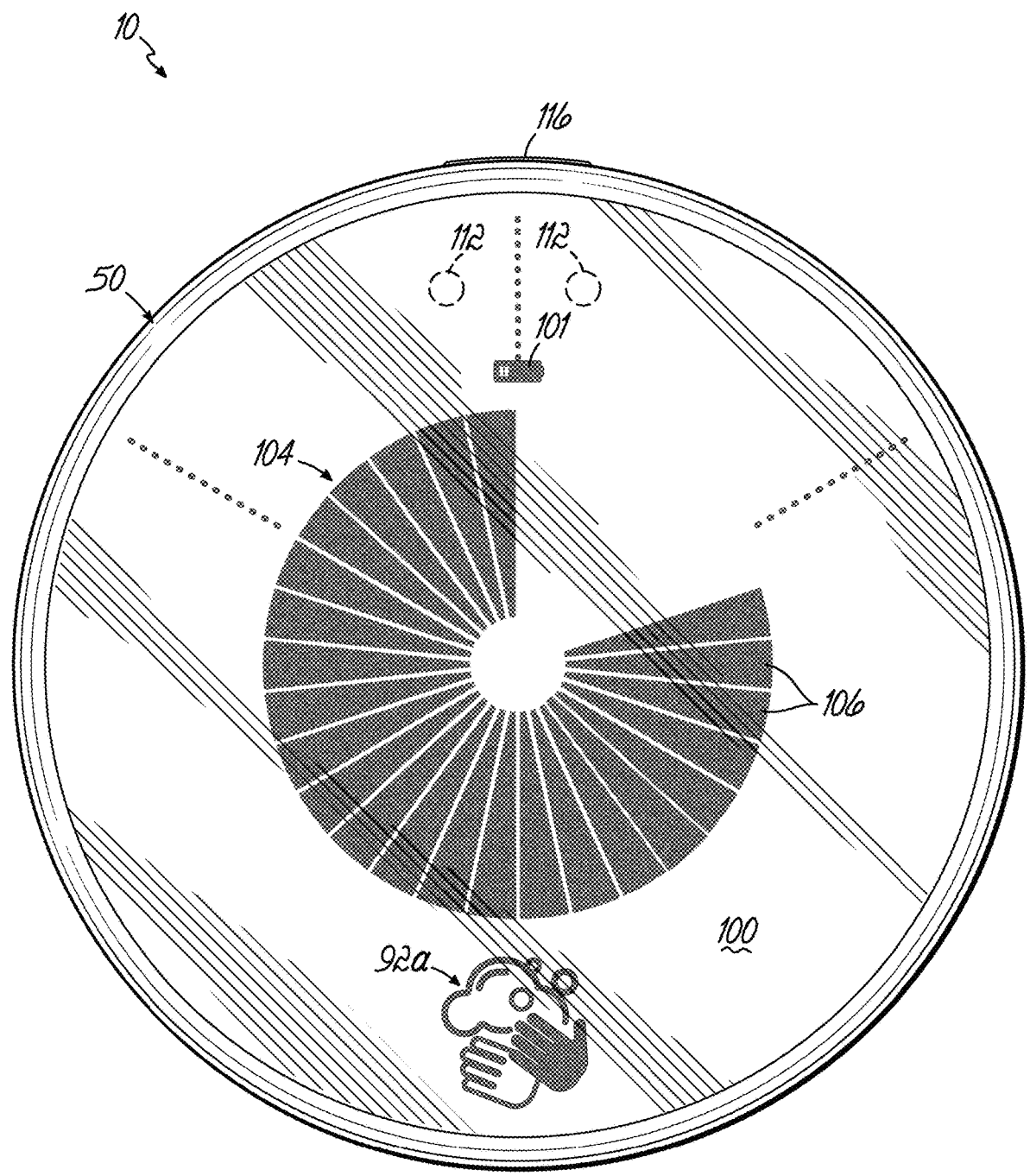
FIG. 6B is a front view of the timer of FIG. 6A showing the display after five seconds have passed.
Figure 6C:
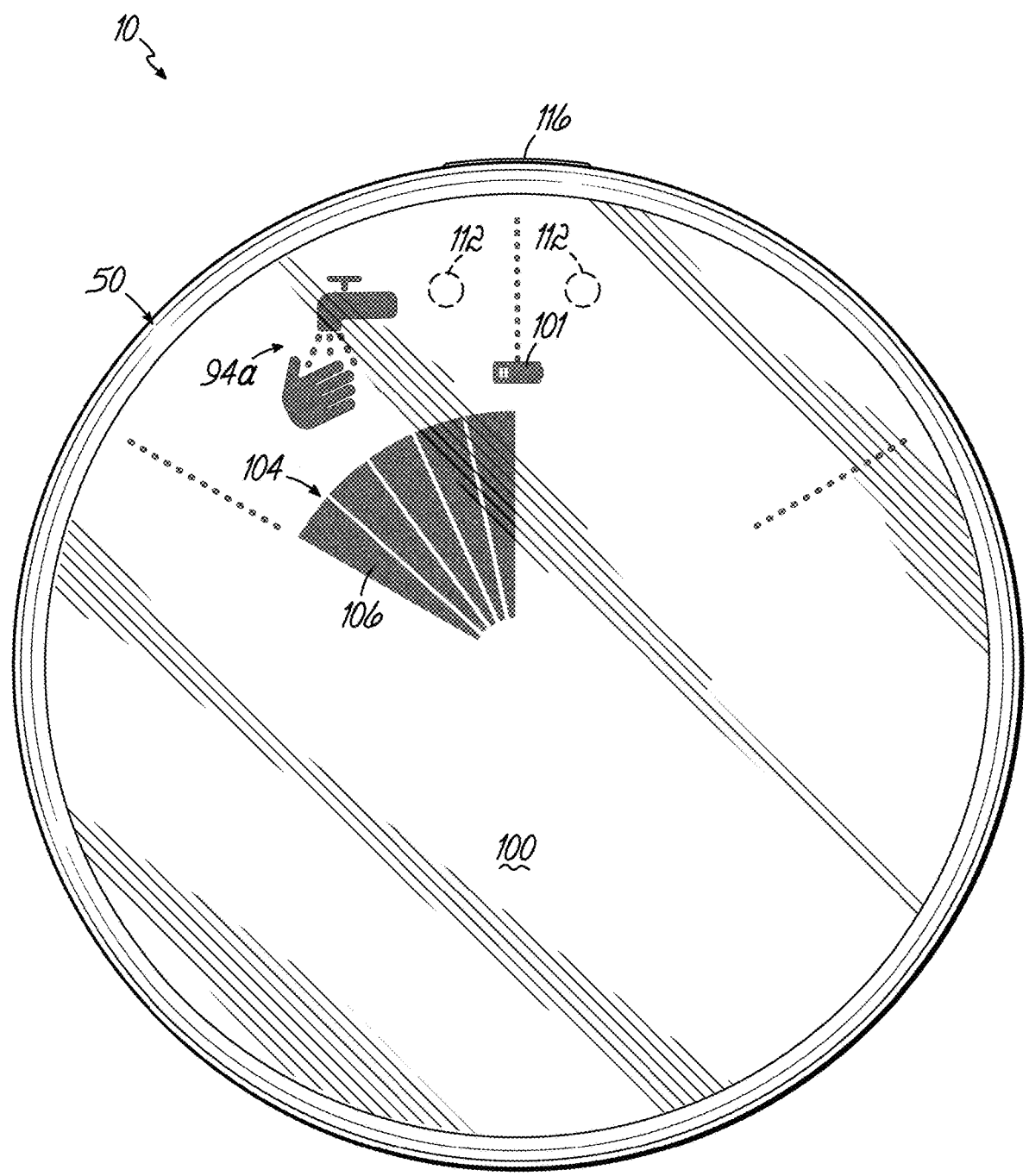
FIG. 6C is a front view of the timer of FIG. 6A showing the display after twenty-five seconds have passed.

The circular plastic front lens 100 of the hands-free visual timer 10 is secured to the front bezel 50. As best shown in FIG. 6A, a first iconic image 90a comprising a hand and a soap dispenser is located at approximately the one o'clock position and is created by illumination of the first icon 90 silkscreened to a rear surface 96 of the plastic front lens 100. As best shown in FIG. 6B, a second iconic image 92a comprising two hands and bubbles is located at approximately the six o'clock position and is created by illumination of the second icon 92 silkscreened to a rear surface 96 of the plastic front lens 100. As best shown in FIG. 6C, a third iconic image 94a comprising a hand and faucet nozzle is located at approximately the eleven o'clock position and is created by illumination of the third icon 94 silkscreened to a rear surface 96 of the plastic front lens 100. FIGS. 6A-6C illustrate another iconic image 101 of a battery which displays only when the battery or batteries need replacing. This image 101 is created by a battery icon silkscreened on the rear surface 96 of the plastic front lens 100.

FIG. 6A illustrates a display visible from the front of the timer after a user activates at least one of two light sensors 112 by passing his or her hand over the light sensors 112. Although the light sensors 112 are illustrated in one location, the drawings are not intended to be limiting. The light sensors 112 may be in any desired locations. In the central display 104, thirty triangles 106 are illuminated and visible to a user initially due to activation of the LCD. At this point in time, the timer 10 begins counting down. After five seconds have passed, five triangles 106 have disappeared from the central display 104 and the first iconic image 90a has been replaced with the second iconic image 92a. See FIG. 6B. After twenty additional seconds have passed for a total of twenty-five seconds, only five triangles remain (25 triangles have disappeared from the central display) and the second iconic image 92a has been replaced with the third iconic image 94a.

Figure 8:
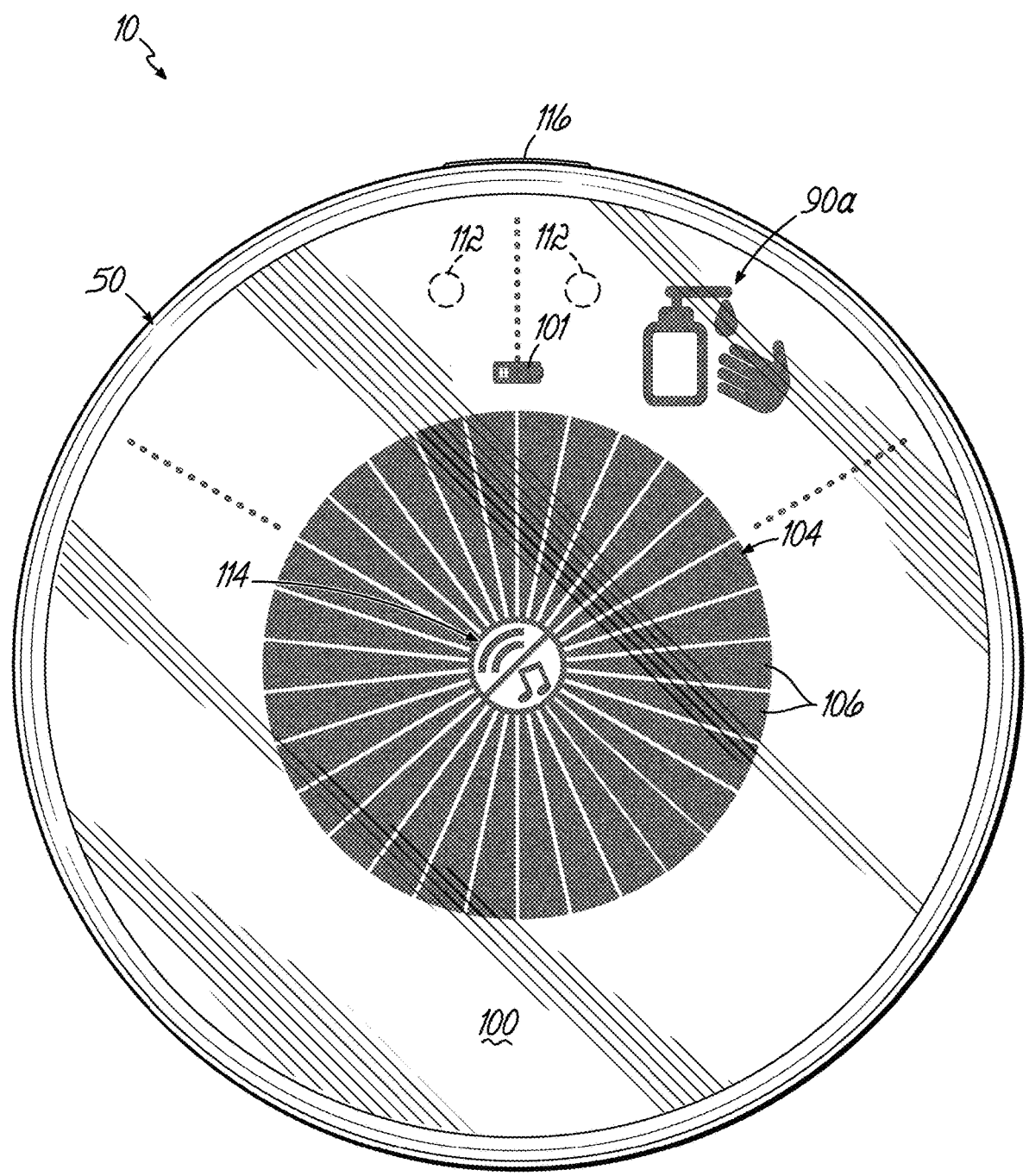
FIG. 8 is a front view of the timer of FIG. 1 showing the sound display in a "silent" sound mode.
Figure 9:
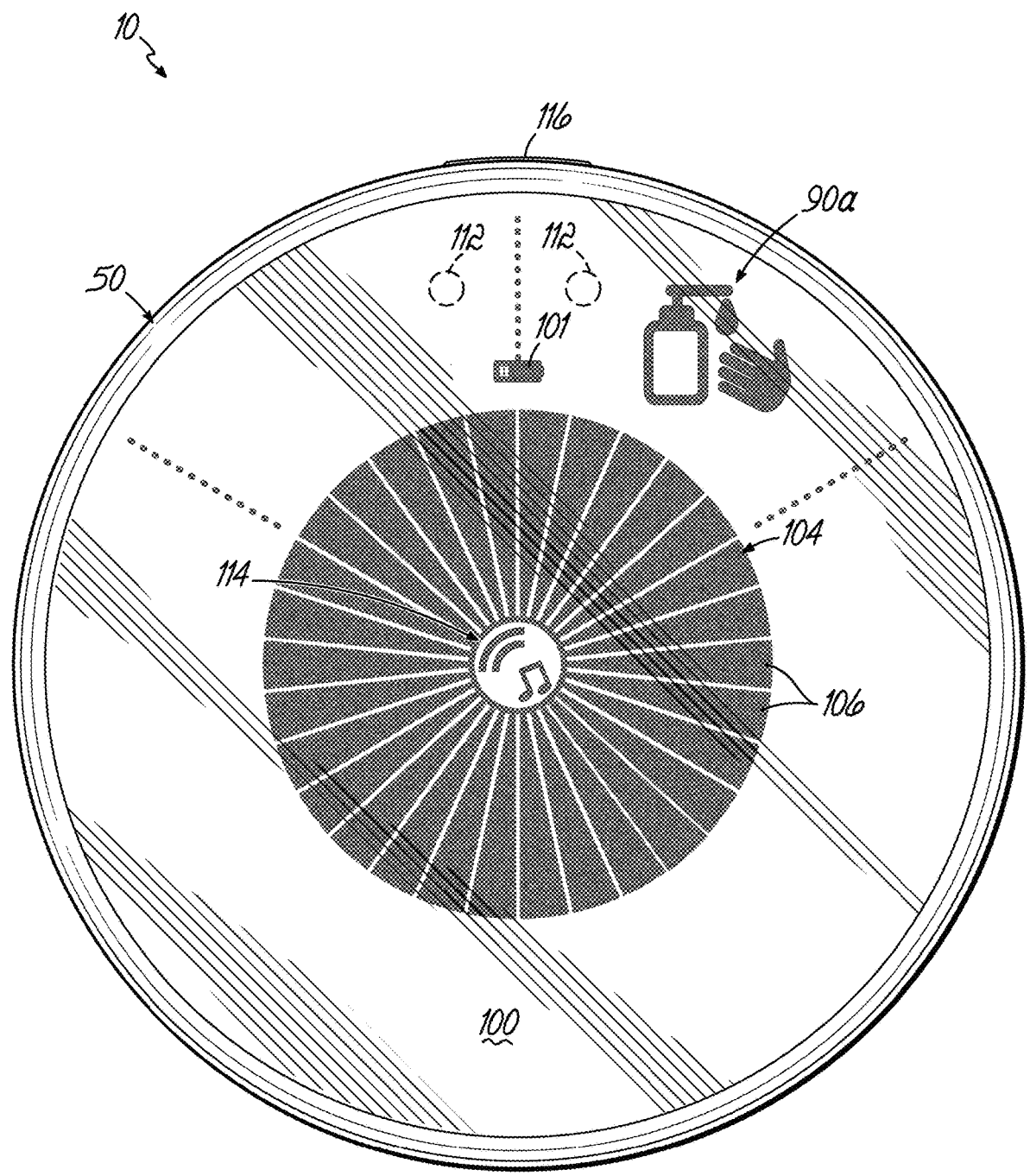
FIG. 9 is a front view of the timer of FIG. 1 showing the sound display in a "full" sound mode.
Figure 10:
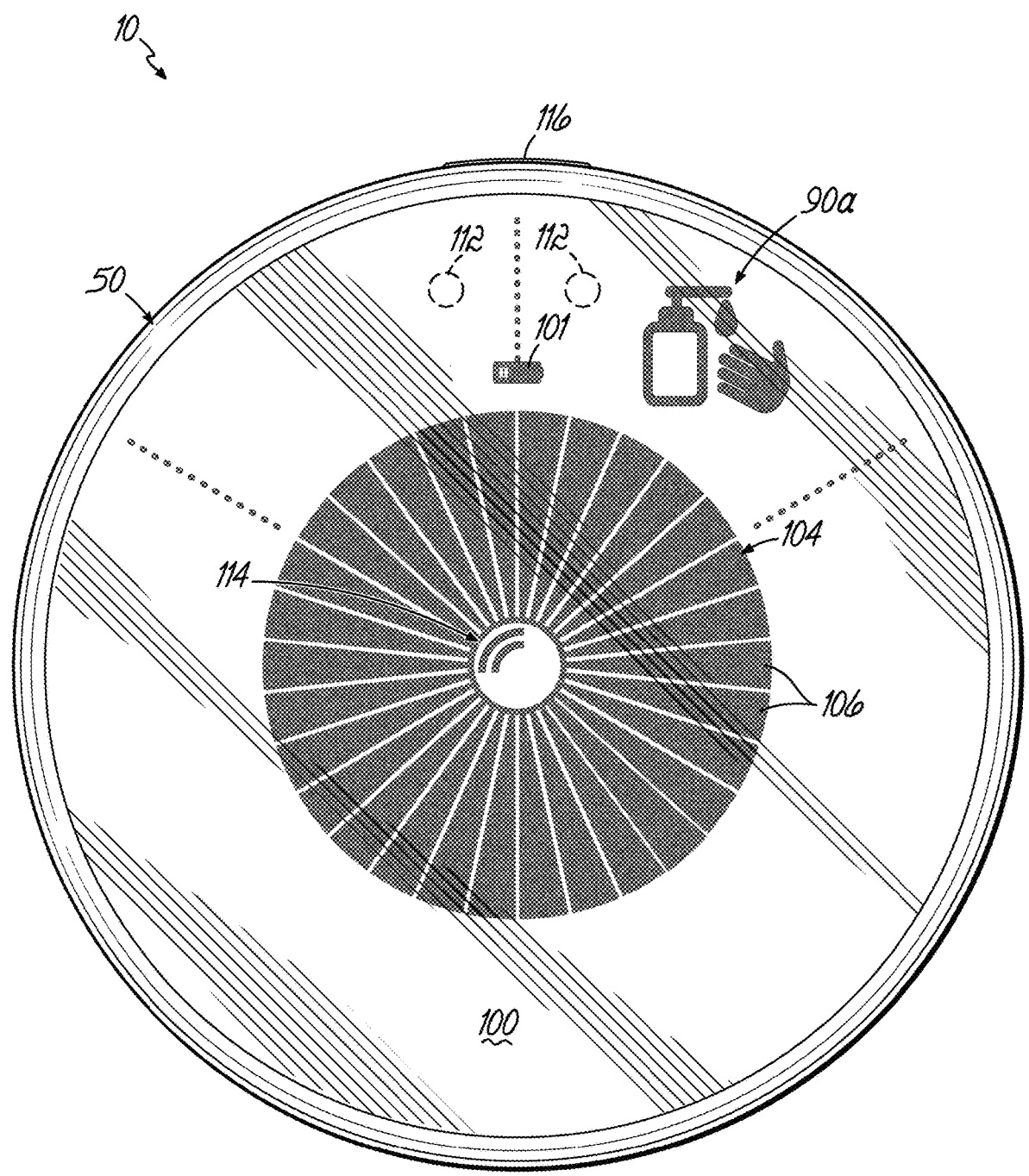
FIG. 10 is a front view of the timer of FIG. 1 showing the sound display in a "beep only" sound mode.

With regards to sound, the hands-free visual timer 10 has a sound display 114 visible to a user only for a predetermined period after a user pushes a button or toggle switch 116 on the top of the housing 12. After the predetermined time period has passed, the center of the central display 104 where the sound display was located will be blank such as shown in FIG. 1. As shown in FIGS. 8-10, the sound display 114 is located at the center of the central display 104. In one embodiment, the predetermined time period is three seconds.

The sound display 114 shows one of three modes of sound shown in FIGS. 8, 9 and 10. The sound mode is changed only by a user pushing the button or toggle switch 116 on the top of the housing 12. A "silent" sound mode is illustrated in FIG. 8 in which a rainbow and music note are both illustrated inside a circle with a line segment between them. During the thirty-second time period, the user hears no sound when the timer is in this "silent" sound mode.

A second "full" sound mode is illustrated in FIG. 9. When the timer 10 is in this sound mode, the music display 114 is identical to the when the timer is in the "silent" sound mode, but the music display 114 lacks the line segment. In this second "full" sound mode, the speaker makes a "beep" sound initially, after five seconds have passed and after twenty-five seconds have passed and after thirty seconds have passed. In addition, music plays continuously during the thirty second period.

In a third "beep only" sound mode shown in FIG. 10, only the rainbow symbol is displayed in the music display 114 and music does not play. The user only hears the "beep" sounds at the intervals described above. The illustrations shown in the sound display 114 for the specified predetermined time after the button or toggle switch 116 has been moved are not intended to be limiting. They may be different than those shown without changing the scope of the present invention.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the faces of the boards may show different time periods than those illustrated. The invention resides in each individual feature described herein, alone, and in all combinations of any and all of those features. Accordingly, the scope of the invention shall be limited only by the following claims and their equivalents.

What is claimed is:

1. A hands-free visual timer for counting a time period comprising:
    a cup-shaped housing having an interior and a battery compartment for storing at least one battery;
    a door for covering the battery compartment;
    a rear cover for covering the battery compartment, the rear covering being adapted to be secured to the cup-shaped housing by rotating the rear cover;
    a circuit board containing light emitting diodes;
    a liquid crystal display capable of showing an annular ring of triangles which disappear as time elapses;
    a front bezel secured to the cup-shaped housing, the front bezel having a circular opening allowing light to pass through the opening in the front bezel;
    at least one light sensor for activating the timer; and
    a plastic front lens.

2. The timer of claim 1, further comprising a rear suction cup which fits inside a keyhole in the rear cover.

3. The timer of claim 1, further comprising a bottom suction cup which fits inside an opening formed between the rear cover and the cup-shaped housing.

4. The timer of claim 1, wherein the rear cover and the cup-shaped housing have a flat surface so the timer may rest on a flat surface without falling over.

5. The timer of claim 1, wherein the plastic front lens has multiple icons silkscreened on a back surface of the plastic front lens.

6. The timer of claim 1, wherein the annular ring of triangles which disappear as time elapses disappear in a clockwise direction.

7. A hands-free visual timer comprising:
    a housing having a battery compartment for storing at least one battery;
    a door for covering the battery compartment;
    a waterproof rear cover for covering the battery compartment, the rear covering being adapted to be secured to the housing;
    a circuit board containing light emitting diodes;
    a liquid crystal display capable of showing an annular ring of triangles which disappear as time elapses;
    a front bezel secured to the housing, the front bezel having openings allowing light to pass through the openings in the front bezel;
    at least one light sensor secured to the front bezel; and
    a plastic front lens having multiple icons silkscreened on a back surface of the plastic front lens.

8. The timer of claim 7, further comprising a speaker in the interior of the housing.

9. The timer of claim 7, wherein the annular ring of triangles comprises thirty triangles, one for each second of time.

10. The timer of claim 7, wherein the rear cover and the housing have a flat surface so the timer may rest on a flat surface without falling over.

11. The timer of claim 7, wherein the housing is cup-shaped.

12. The timer of claim 7, wherein the annular ring of triangles disappears in a clockwise direction as time elapses.

13. The timer of claim 7, wherein the plastic front lens has three icons outside the annular ring of triangles.

14. A method of using a hands-free visual timer for assistance washing hands for a predetermined time period, the method comprising:
    activating a light sensor secured to a front bezel of the timer by waving a hand in front of the timer, the front bezel of the timer being secured to a housing, the housing having a battery compartment for storing at least one battery to power the timer, wherein upon activation, a single color liquid crystal display shows an annular ring of triangles and a light emitting diode displays a first icon,
    waiting a first time period until a first number of triangles disappear and a second icon appears on the face of the timer;
    waiting a second time period until a predetermined number of additional triangles disappear and a third icon appears on the face of the timer; and
    waiting a third time period until all the triangles have disappeared and the face of the timer is blank.

15. The method of claim 14, wherein the triangles disappear in a clockwise direction.

16. The method of claim 14, wherein the first icon includes a human hand.

17. The method of claim 14, further comprising using a suction cup secured to the timer to secure the time in a desired location.

18. The method of claim 14, further comprising setting a speaker on silent mode.

19. The method of claim 14, further comprising setting a speaker on a mode which plays music.

* * * * *